Nov. 13, 1951 G. A. BURKETT 2,574,727
PHARMACEUTICAL CAPSULE SIZING DEVICE WITH
VOLUMETRIC CAPACITY VARYING MEANS
Filed Feb. 9, 1948 2 SHEETS—SHEET 1

Inventor:
By:- George A. Burkett.
his Atty's.

Nov. 13, 1951     G. A. BURKETT     2,574,727
PHARMACEUTICAL CAPSULE SIZING DEVICE WITH
VOLUMETRIC CAPACITY VARYING MEANS
Filed Feb. 9, 1948     2 SHEETS—SHEET 2

Inventor:
By: George A. Burkett
[signature]
his Atty's.

Patented Nov. 13, 1951

2,574,727

UNITED STATES PATENT OFFICE 2,574,727

PHARMACEUTICAL CAPSULE SIZING DEVICE WITH VOLUMETRIC CAPACITY VARYING MEANS

George A. Burkett, St. James, Manitoba, Canada

Application February 9, 1948, Serial No. 7,103

1 Claim. (Cl. 226—40)

My invention relates to new and useful improvements in pharmaceutical capsule loaders, and an object of my invention is to provide a device of the character herewithin described by which a prescription of either powder or crystalline composition may be divided accurately into the requisite number of parts.

A further object of my invention is to provide a device of the character herewithin described which, in association with the principal object, will indicate the size of capsule necessary to contain the resultant quantities of the prescription be they either in powder or crystalline form.

Another object of my invention is to provide a device of the character herewithin described which will facilitate the transference of the divided prescription to the capsules and at the same time ensuring that an equal quantity is deposited in each capsule.

A still further object of my invention is to provide a device of the character herewithin described which allows pharmaceutical capsules to be filled with accuracy and rapidity, and at the same time ensuring equal division of the prescription among the capsules.

Another object of my invention is to provide a device of the character herewithin described which, due to the quantitative accuracy thereof results in equal density of the powder or crystals in each individual capsule.

A still further object of my invention is to provide a device of the character herewithin described which permits the prescription to be loaded into the capsules with a lower density or pressure than by hand, thus assisting materially the dissolution thereof in the stomach and the absorption thereby.

A still further object of my invention is to provide a device of the character herewithin described which is economical in manufacture, simple in operation, and which, due to its construction, may readily be cleaned after each operation.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which—

In the drawings like characters of reference indicate corresponding parts in the different figures.

In the pharmaceutical profession, it is well known that considerable difficulty is experienced in the filling of capsules from prescriptions received from the members of the medical profession. The conventional practice is for the prescriber to indicate only the total quantity of the ingredients together with the total number of capsules required, and it will therefore be realised that considerable time is involved in arriving at the correct size of capsule necessary. At the present time this is determined by dividing the total volume or weight of the prescription by the number of capsules required, and arriving at the correct size of capsule either by weighing one portion of the prescription or by trial and error methods. It will be appreciated that by this procedure it is extremely difficult to ensure that each capsule contains exactly equal quantities of the prescription. Having determined the correct capsule size, it is then necessary to transfer the prescription equally and accurately to the capsules, and this process requires considerable skill on the part of the pharmacist in order to ensure quantitative accuracy, and it will be appreciated that when the number of capsules is large, then the time expended on each prescription is considerable.

Consequently I have designed the device hereinafter to be described in order to alleviate these difficulties as far as possible in the manner hereinafter explained.

Figure 1:
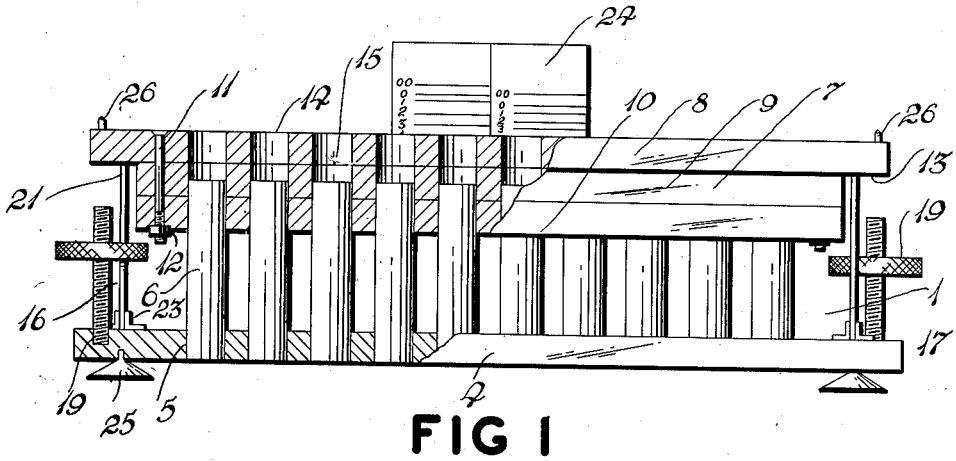
Figure 1 is a side elevational view of my adjustable spreading table assembly sectioned in part to show the interior thereof.

It will be seen upon reference to the accompanying drawings, that my invention comprises a spreading table assembly collectively designated 1, a capsule retaining and funnelling plate 2 and a capsule-body holder 3. The spreading table assembly which is best illustrated by Figure 1 of the accompanying drawings, embodies a base plate 4 constructed preferably but not necessarily of one of the transparent plastics, and is provided with a plurality of vertical drillings 5. Upstanding and at right angles to the aforementioned base plate are the cylindrical plug members 6, rigidly engageable with the aforementioned drillings. The spreading table component collectively designated by the reference character 7 is shown constructed of three separate parallel plates 8, 9 and 10 preferably of a material similar to the base plate 4, and maintained in permanent lamination by virtue of the countersunk bolts 11 and the nuts 12, but it will be appreciated that this section may be manufactured from one piece of material and machined to leave the overhanging shoulder 13 around the perimeter of the component. Open-ended apertures 14 in the form of vertical drillings are provided in the spreading table registerable with and slidably engageable by the aforementioned plugs, thus constituting what I term wells 15.

Figure 3:
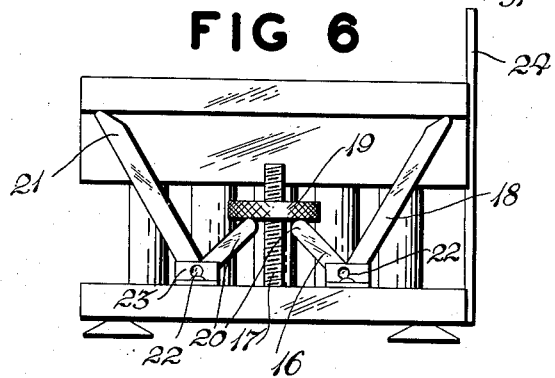
Figure 3 is an end elevation of the device of Figure 2.

The spreading table component is adjustably supported by means of a multi-point jacking assembly collectively designated 16 which comprises two vertical externally screw-threaded studs 17, the fulcrum levers 18 and the actuating components 19. These actuating components are shown in the form of knurled wheels centrally drilled and internally screw-threaded thus being rotatably engageable with the aforementioned externally screw-threaded vertical studs 17. The two vertical studs are attached to the base plate 4 by engaging with the blind drillings 19 therein and it is desirable that the screw threads on the studs be oppositely turned for ease of manipulation. The fulcrum levers 18, the configuration of which is shown most clearly in Figure 3 of the accompanying drawings are manufactured preferably but not necessarily from flat stock and are seen to take the form of bell cranks with the initiating arms 20 being of relatively short length and the bearer arm 21 being substantially longer and angulated approximately at right angles to the former. Pivot pins 22 mounted in suitable bearing blocks 23 act as fulcra thus providing leverage of the third class.

Mounted on one side of the base plate by suitable means, and upstanding at right angles therefrom is my capsule-size indicating scale plate 24 which carries two scales, one for crystalline and the other for pulverized material, the function of which will hereinafter be described. On the under side of the base plate and approximately at the corners thereof are my combination vibration and steadying pads comprising in this instance conical rubber cups 25 screwed or dowelled to the base plate in a conventional manner. A plurality of location dowel pins 26 are provided substantially around the perimeter of the upper surface of my spreading table in order to facilitate accurate registration of my funnelling plate 2.

Figure 4:
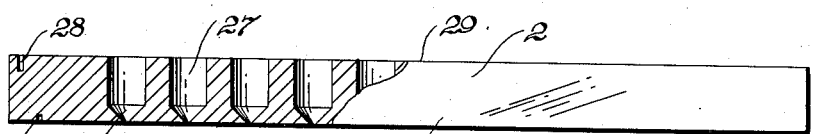
Figure 4 is a side elevational view of my funnelling plate sectioned in part to show the interior thereof.

This funnelling plate, which is preferably constructed of similar material to the rest of the assembly, has a perimetrical configuration substantially similar to my spreading table, and is provided with a plurality of vertical drillings 27 therein. These drillings are so positioned to allow of perfect registration with the aforementioned vertical drillings 14 in my spreading table assisted by the dowel pins 26 thereof engaging with the dowel pin recesses 28 situated on what might be termed the upper surface 29 of my funnelling plate with reference to Figure 4 of the accompanying drawings. It will be seen that the vertical drillings 27 in my funnelling plate decrease in diameter to form conical pouring apertures 30 in order to assist in the transference of the comminuted material from the aforementioned wells 15 to the capsules as will hereinafter be explained.

Figure 5:
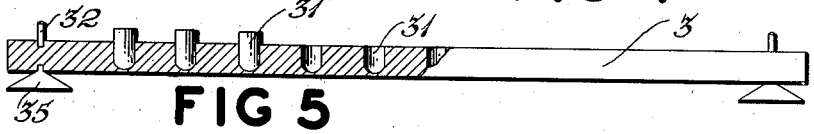
Figure 5 is a side elevational view of one of my capsule-body holders sectioned in part to show the interior thereof.
Figure 2:
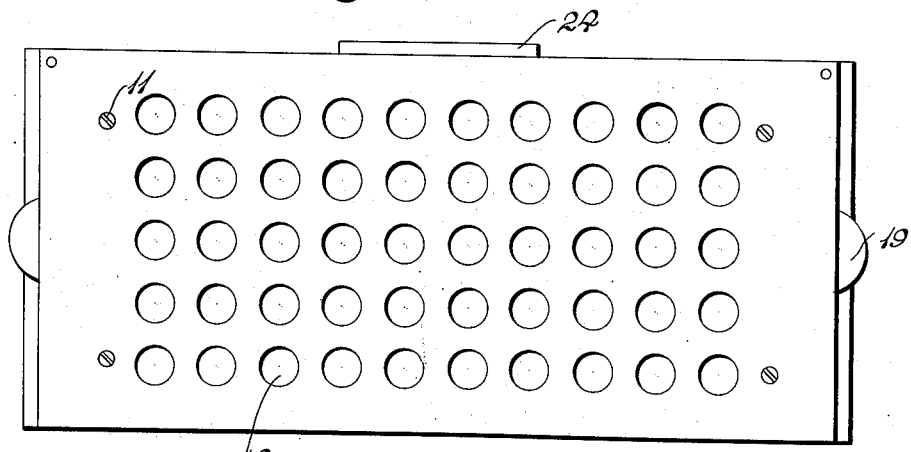
Figure 2 is a plan view of my spreading table assembly.

My capsule-body holder, an example of which is illustrated in Figure 5 of the accompanying drawings, is constructed of a parallel flat plate preferably of similar material to the remainder of the device and is provided with a plurality of blind drillings 31 in one face thereof. The capsule bodies 31' are receivable by these blind drillings which provide support thereto in order that they may be in registration with the aforementioned conical pouring portion of my funnelling plate. This registration is enhanced by virtue of the capsule body holder dowel pins 32 situated on the upper surface of the capsule body holder engageable with the corresponding dowel pin recesses 33 on what might be termed the under side or under surface 34 of my funnelling plate. Conical rubber cups 35 are provided around the perimeter of my capsule-body holder plate on the opposite side to the blind drillings 31 and perform a similar function to the aforementioned conical rubber cups 25 on my base plate 4. In connection with my capsule-body holder plate it will be appreciated that a series of plates will be required with blind drillings of various diameters in order to receive and support the several sizes of capsules commonly in use.

Having now described my invention in detail, its method of operation will now be presented.

Figure 6:
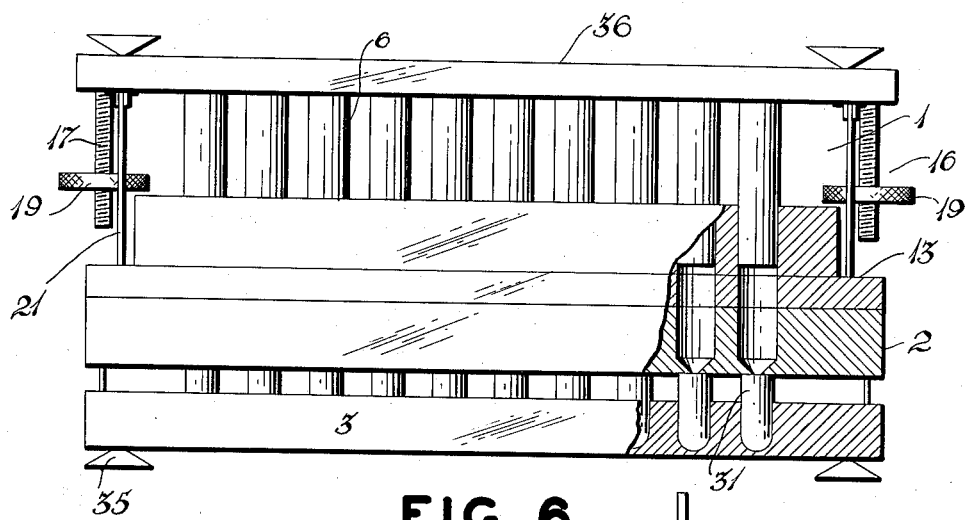
Figure 6 is a side view of my entire assembly in the capsule filling position sectioned in part to show the interior thereof.

The comminuted material comprising the prescription is placed upon the upper surface of my spreading table, and the apertures 14 not required are blanked off by a card (not illustrated) or similar means. The material is induced into the wells 15, the volumetric capacity of which is adjusted by means of the multi-point jacking assembly 16. It will be appreciated that the rotation of the knurled wheels 19 in one direction will cause the spreading table to lower in relation to the plugs 6 thus decreasing the well capacity whereas rotation of the knurled wheels in the opposite direction will cause the table to elevate thus increasing the well volume. The spreading table level is adjusted until all the comminuted material has been precipitated into the wells so that the surface of the material lies flush with the surface of the table. This process may be assisted by lightly tapping the spreading table thus imparting slight vibration to the material by virtue of the aforementioned conical rubber cups 25. At this stage the capsule size is indicated on the scale plate 24 by the edge of the spreading table coterminus with this scale, and it will be appreciated that the relevant scale must be used depending upon whether the comminuted material is of powder or crystalline composition. The requisite number of capsule bodies is now inserted in the corresponding apertures in the capsule body holder plate 3, and the funnelling plate 2 is next placed superjacent upon it, ensuring that the location dowel pins 32 engage with the corresponding dowel recess 33. These two plates are then turned over, care being taken to maintain them as one unit, after which they are placed upon the upper surface of the spreading table assembly, again ensuring that the location dowel pins 26 of the spreading table engage with the dowel recess 28 of the funnelling plate, and that the apertures containing the capsules are aligned with the wells containing the comminuted material. In this context I desire to stress the fact that, during this over-turning operation, the capsules within the capsule plate are prevented from spilling out by the funnelling plate 2 due to the interfacial relationship of the capsules with the funnelling plate, which relationship seals the open ends of the capsules. It should be noted at this point that the surface 29 of the funnelling plate is designed for substantially surface contact with the upper surface of the spreading table in order to prevent the comminuted material from escaping therefrom. The entire assembly comprised of the base plate-spreading table assembly, funnelling plate, and capsule-body holder plate, is now turned over and assumes the position shown most clearly in Figure 6 of the accompanying drawings. Light tapping on the now uppermost face 36 of the base plate 4 sets up vibration assisted by the aforementioned conical rubber cups 35 of the capsule-body holder plate, and induces the comminuted material to be transferred from the wells 15, through the apertures 27 of the funnelling plate, and into the capsule bodies 31 located in the capsule body holder plate, entrance to the latter being facilitated by the conical formation of the funnelling plate apertures 30. When this process is completed, as may readily be ascertained if the assembly is constructed of transparent plastic material, the spreading table assembly together with the funnelling plate may be removed bodily and the capsule caps installed while the capsules remain supported by the capsule body holder.

It will be realized from the foregoing description that a large number of capsules may be filled at one time with considerable speed, at the same time ensuring that each individual capsule contains the same quantity of material at the same density, and it is believed that the advantages and use of the invention will be clearly apparent from the foregoing disclosure, and accordingly further description thereof at this point is considered unnecessary.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

A pharmaceutical capsule sizing device comprising in combination with a capsule retaining plate, a spreading table having a surrounding over-hanging shoulder provided with a set of material receiving, open-ended apertures therein, a set of outstanding, plate-mounted plugs engageable with said apertures, said plugs and apertures thus constituting wells, means for moving said plugs relative to said apertures to vary the depth of said wells and hence the volumetric capacity thereof, said means for moving said plugs consisting of at least two multi-point jacking assemblies mounted on said plug plate, each assembly embodying a substantially vertical, externally screw-threaded stud, a pair of fulcrum levers, and an actuating component on said stud, said fulcrum levers taking the form of bell-cranks, and including initiating arms engageable with said actuating component and bearer arms engaging with the interfacing surface of said surrounding shoulder, and means for transferring the contents of said wells into capsules, said means comprising a multi-apertured funnelling plate insertable between said capsule retaining plate and said spreading table.

GEORGE A. BURKETT.

REFERENCES CITED

The following references are of record in the file of this patent:

UNITED STATES PATENTS

| Number | Name | Date |
|---|---|---|
| 578,985 | Grove | Mar. 16, 1897 |
| 2,010,699 | Pattee | Aug. 6, 1935 |

FOREIGN PATENTS

| Number | Country | Date |
|---|---|---|
| 363,741 | France | May 12, 1906 |